R. JENSEN.
AUTOMATIC VAPORIZER.
APPLICATION FILED MAR. 27, 1916.
1,235,806.
Patented Aug. 7, 1917.
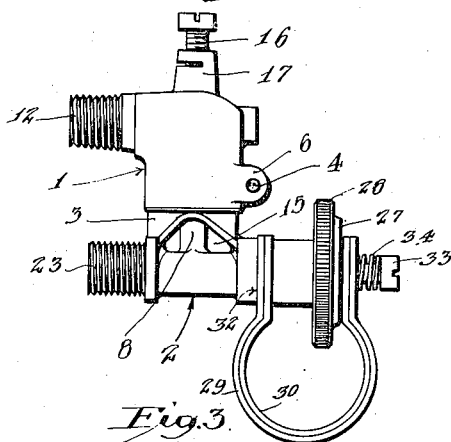
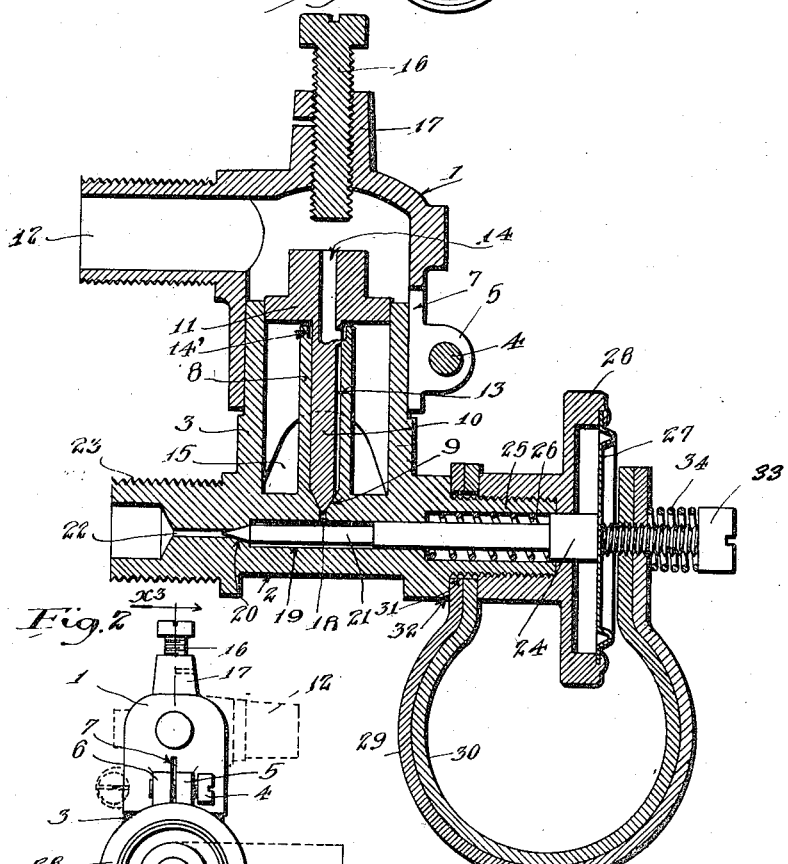
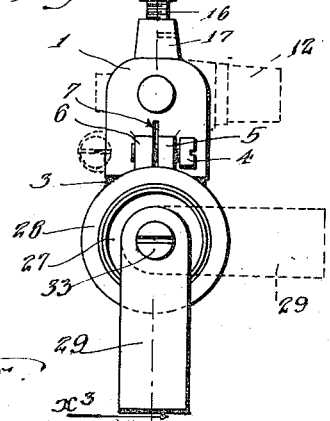

UNITED STATES PATENT OFFICE.

RASMUS JENSEN, OF LOS ANGELES, CALIFORNIA, ASSIGNOR OF ONE-HALF TO EDGAR L. COLBURN, OF LOS ANGELES, CALIFORNIA.

AUTOMATIC VAPORIZER.

1,235,806.            Specification of Letters Patent.      Patented Aug. 7, 1917.

Application filed March 27, 1916. Serial No. 86,952.

*To all whom it may concern:*

Be it known that I, RASMUS JENSEN, a citizen of the United States, residing at Los Angeles, in the county of Los Angeles and State of California, have invented a new and useful Automatic Vaporizer, of which the following is a specification.

This invention relates to devices designed to supply a mixture of air and liquid to internal combustion engines and is an improvement on the water vaporizer for carbureters patented to me December 14, 1915, No. 1,163,930.

An object of this invention in common with my previous invention noted above is to furnish air and water in the correct proportions to the engine so as to improve the quality of the fuel charge supplied to the engine.

This device differs in many respects from the above mentioned patented device and the differences and advantages will be more clearly set forth in the subjoined detail description.

The accompanying drawings illustrate the invention.

Figure 1 is a side elevation of a vaporizer built in accordance with this invention.

Fig. 2 is an end elevation from the right of Fig. 1, broken lines indicating different positions of the mixing chamber and thermostat than in full lines.

Fig. 3 is an enlarged vertical section on line indicated by $x^3$—$x^3$, Fig. 2.

The body of the device is in two separable parts or sections and comprises a mixing chamber 1 and a valve cage 2 in telescopic relation to one another, the mixing chamber fitting over a tubular air chamber 3 of the valve cage and being held in place by a screw 4 which passes through a lug 5 and is screw-threaded into a second lug 6, there being a slot 7 cutting between said lugs and cutting through the wall of the mixing chamber so that when the screw is tightened up the diameter of that portion of the mixing chamber surrounding the air chamber 3 can be reduced to make a tight joint between the mixing chamber and air chamber. Of course the joint could be threaded if so desired, but the advantage of the construction just described is that the mixing chamber and valve cage may be turned at any desired angle relative to one another so that the device may the more readily be connected to the internal combustion engine in conjunction with which it is to operate.

The air chamber 3 is provided centrally thereof with a vertical tube 8 having at its lower end a conical valve seat 9 adapted to be engaged by a needle valve 10 provided at its upper end with a draft-operated member in the form of a draft-operated valve 11 which is of substantially the same diameter as the inside diameter of the air chamber 3 and fits therein when the valve 10 is on the seat 9 so as to shut the upper end of the air chamber from the mixing chamber.

The valve 11 and valve 10 are caused to rise by difference of air pressure in the mixing chamber and air chamber on opposite sides of the valve 11 and the difference in pressure may be produced, for instance, by suction of an internal combustion engine connected by any suitable means to a discharge port 12 of the mixing chamber 1. The valve 10 is provided with a longitudinally extending duct 13 extending from the lower end of the valve 10 upward to within a slight distance of a port 14 which extends from the periphery of the valve 10 radially inward and thence upward through the center of the valve 11 and communicates with the interior of the mixing chamber 1.

The tube 8 is provided interiorly at its upper end with an annular groove 14' which registers with the port 14 when the valve 10 is in closed position. When the valve 10 is in closed position the valve 11 is slightly spaced from the upper end of the tube 8.

It is now clear that when the pressure on the upper side of the valve 11 is a trifle less than that on the under side, the valve 11 and valve 10 will be raised slightly so as to lift the valve 10 off of its seat 9 and that when the lift is very slight the only air that can pass from the air chamber 3 to the mixing chamber 1 will be over the upper end of the tube 8 and thence through the port 14; and furthermore if the air pressure on the upper side of the valve 11 be considerable less than that on the under side of said valve, the valve 11 and valve 10 will be lifted considerably so as to open the upper end of the air chamber 3 and allow air to pass from the air chamber around the valve 11 into the mixing chamber. Air enters the mixing chamber 3 through a suitable port or ports 15 at the lower end of the air chamber 3.

The valve 11 may be adjustably limited in its lifting movement by an adjustable stop in the form of a screw 16 threaded through a boss 17 on the top of the mixing chamber 1.

From the valve seat 9 there extends a duct 18 controlled by the valve 10 and communicating with a valve chamber 19 provided at one end with a valve seat 20 adapted to be engaged by a needle valve 21 which controls a liquid intake port 22 extending from the valve seat 20 through a threaded nipple 23 that is adapted to be connected to a suitable source of liquid supply such as water. The valve 21 terminates at its outer end in a head 24 adapted to project beyond the end of a spring chamber 25 through which the valve 21, projects, there being a coil spring 26 extending between the head 24 and inner end of the spring chamber tending to move the valve 21 outward from its seat 20.

The head 24 of the valve 21 contacts with a diaphragm 27 which is mounted in a nut 28 screw-threaded onto the spring chamber 25.

Means are provided to adjustably limit the movement of the diaphragm 27 and such means are thermally operated and the construction whereby this is effected will now be described.

A thermostat in the form of an open loop constructed of bands 29, 30 of different metals is provided at one end with an eye 31 to accommodate the spring chamber 25, the nut 28 being turned up tight against the thermostat to hold said thermostat against a shoulder 32 at the base of the spring chamber 25 so as to securely and adjustably hold the thermostat in place. The thermostat, as clearly shown in Fig. 2, may be turned at various angles relative to the air chamber 3 so that when the device is being connected to the internal combustion engine with which it is to function, said thermostat may be adjusted so that it will not be interfered with by any of the engine parts or accessories of the engine. The opposite end of the thermostat is provided in axial alinement with the eye 31, so that said thermostat may readily be turned at different angles with an adjusting screw 33 screw-threaded therethrough and having its inner end engaging the diaphragm 27 so as to exert pressure on said diaphragm to hold it against the pressure of the valve plug 21. Thus by screwing the adjusting screw 33 in or out the valve plug 21 may be adjusted toward or from its seat 20. Between the thermostat and the head of the screw 33 is a coil spring 34 frictionally engaging the head of the screw so that vibrations to which the device may be subjected will not tend to cause turning of the screw and changing of the adjustment of the valve 21 when said adjustment has once been made.

The spring 26 tends to move the valve 21 to open the port 22. At lower thermostatic temperatures the screw 33 may be adjusted to close the valve 21 when the atmospheric air is cool and moist and may, when the air is hot and dry, be adjusted to allow the valve 21 to open a predetermined amount dependent upon the adjustment of said screw to admit a small volume of water to the valve chamber 19; and at higher temperatures the thermostat 29, 30 will operate to move the screw 33 outward so as to allow the diaphragm greater latitude of movement in order that the spring 26 can operate to move the valve 21 farther away from its seat 20 so as to admit more water to the valve chamber 19, whence said water flows through the port 18 upon operation of the valve 11 as hereinbefore described.

In practice, the outlet 12 will be connected to the carbureter of an internal combustion engine or to the intake manifold so that the suction of the engine will operate the valve 11. Assuming that the nipple 23 is connected to a water supply, the suction of the engine at low speeds thereof, when the screw 33 is adjusted to permit the valve 21 to be open, will cause the valve 11 to lift so as to admit water from the valve chamber 19 through the port 18 into the tube 8. The water will be sucked from the tube 8 through the port 14, and air will be sucked from the air chamber 3 over the end of the tube 8 and through the port 14. The watery vapor produced in the mixing chamber 1 will pass through the outlet 12 into the carbureter or manifold, as the case may be, and thence into the engine cylinders thus humidifying the charges of fuel vapors to be sucked into said engine.

When the engine heats up, heat therefrom will produce expansion of the thermostat elements 29, 30 so that a greater volume of water will pass into the valve chamber 19 and thence to the engine.

The watery vapor thus sucked into the engine with the fuel absorbs some of the heat of combustion and prevents overheating of the engine and prevents the many engine troubles incident to overheating.

In the patented device hereinbefore referred to, the positions of the outlet and thermostat could not be changed relative to other parts of the device as with this invention and the operation of the thermostatic control was not so positive and delicate as in this present device because of the tendency of the thermostat controlled valve plug to stick. Another advantage of this present device over said patented device is that watery vapor may be sucked into the engine without admitting any appreciable amount of auxiliary air, because the valve 11 does not open the air chamber 3 until the difference in pressures is such as to raise the valve 11 a comparatively great distance, whereas in the prior device, auxiliary air was admitted even before the water admission valve operated to open.

It is noted that in this device the valves 10 and 11 absolutely coöperate at all times regardless of the minuteness of movement of the valve 11, and this results because the valves 10 and 11 are connected to one another. This gives good automatic adjustment under varying suction.

One great advantage of this present construction over that of the prior device is that in this device the draft or suction-operated valve 11 is operated to close from full open position by gravity only, and when operated to open the suction works against the weight of the valves 10, 11 only and not against any spring, whereas in the prior device, after the air valve lifts a small amount, the force of a spring must be overcome for further opening of the air valve and said force also operates to move the air valve from full open position to within a short distance of closed position. Of course when a spring is used, the more the spring is compressed the greater the force that is needed to overcome the expansive force of the partly compressed spring in order that the air valve may open farther, whereas when gravity alone is relied upon the action of the air valve will be much smoother and its lift will be more in a constant ratio to the engine suction so that the proportions of watery vapor and air admitted to the engine at high engine speeds will be substantially the same as at low engine speeds.

The foregoing will enable those skilled in the art to which the invention appertains to make and use the device.

I claim:

1. In combination, a body designed to be connected to the intake of an explosive engine and having an outlet passage and an air inlet port, a valve between said passage and port, a fluid supply port communicating with the passage, a second valve to control said fluid supply port, a nut screw-threaded onto said body, a diaphragm mounted in said nut and engaging the outer end of the second-named valve, a thermostat, and an adjusting screw projecting from the thermostat and engaging the diaphragm.

2. In combination, a valve body having an air chamber provided with an air inlet port, a tube inside of the air chamber provided with a valve seat, there being a fluid inlet port in said body, a valve to engage said seat and control the admission of fluid through said fluid inlet port, and a valve at the upper end of the valve chamber provided with a port opening from the upper face thereof to the periphery of the first-named valve, said valve port communicating with the interior of the tube when the air admission valve is closed and said second named valve being spaced from the upper end of the tube when said valve is in closed position.

3. A vaporizer comprising a body having a passage formed therein, the outlet end of said passage being adapted for communication with the intake manifold of an explosive engine, the intake end of said passage communicating with the atmosphere, a valve in said passage between the ends thereof, said body having a fluid intake passage communicating with the first passage between the valve and intake end thereof, a second valve controlling the fluid intake passage and connected with and movable by the first-named valve, said second valve opening when the first valve is moved and before said first-valve opens, and said first named valve having a passage therethrough communicating with the first-named passage between the outlet end thereof and the first named valve and with the second passage between the second valve and the outlet end thereof, and said first named valve being spaced from the outlet end of the second named passage when the second named valve is in closed position.

4. In combination, a valve body having an air chamber provided with an air inlet port, a tube inside of the air chamber provided with a valve seat and provided with an annular groove, a valve to control the outlet from the air chamber having a port opening from the top of the valve to the annular groove when the valve is closed, said valve being spaced from the top of the tube when in closed position, and a valve to fit the valve seat in the tube and connected with the first named valve, said second named valve having a longitudinal duct extending from the lower end thereof and terminating a slight distance from the port in the first named valve.

5. In combination, a body designed to be connected to the intake of an explosive engine and having an outlet passage and an air inlet port, a valve between said passage and port, a fluid supply port communicating with the passage, a second valve to control said fluid supply port, and a thermostat pivoted to the body and pivotally connected with the second valve in axial alinement with said pivot so that said thermostate can be turned at different angles relative to said body.

Signed at Los Angeles, California, this 14th day of March, 1916.

RASMUS JENSEN.

Witnesses:
GEORGE H. HILES,
ANNA F. SCHMIDTBAUER.